United States Patent
Kato et al.

(10) Patent No.: US 9,590,700 B2
(45) Date of Patent: Mar. 7, 2017

(54) INTERFACE UNIT AND COMPUTER

(71) Applicant: Murata Manufacturing Co., Ltd., Nagaokakyo-shi, Kyoto-fu (JP)

(72) Inventors: Noboru Kato, Nagaokakyo (JP); Shinichi Nakano, Nagaokakyo (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 0 days.

(21) Appl. No.: 14/340,602

(22) Filed: Jul. 25, 2014

(65) Prior Publication Data

US 2014/0335785 A1    Nov. 13, 2014

Related U.S. Application Data

(63) Continuation of application No. PCT/JP2013/083398, filed on Dec. 12, 2013.

(30) Foreign Application Priority Data

Dec. 21, 2012   (JP) .................... 2012-280323

(51) Int. Cl.
| | |
|---|---|
| *H04B 5/00* | (2006.01) |
| *H01Q 7/00* | (2006.01) |
| *G06F 1/16* | (2006.01) |
| *G06F 3/044* | (2006.01) |
| *H01Q 1/52* | (2006.01) |
| *H01Q 1/22* | (2006.01) |

(52) U.S. Cl.
CPC .......... *H04B 5/005* (2013.01); *G06F 1/1698* (2013.01); *G06F 3/044* (2013.01); *H01Q 7/00* (2013.01); *G06F 2203/04107* (2013.01); *H01Q 1/2266* (2013.01); *H01Q 1/526* (2013.01)

(58) Field of Classification Search
CPC ..... H04B 5/0018; H04B 1/3833; H04B 1/385
USPC ............................... 455/41.1, 90.3; 345/173
See application file for complete search history.

(56) References Cited

U.S. PATENT DOCUMENTS

| | | | |
|---|---|---|---|
| 5,326,627 A | 7/1994 | Yazaki et al. | |
| 6,424,355 B2 * | 7/2002 | Watanabe | ..................... 345/163 |

(Continued)

FOREIGN PATENT DOCUMENTS

| | | |
|---|---|---|
| JP | 06-008320 A | 1/1994 |
| JP | 2003-285385 A | 10/2003 |

(Continued)

OTHER PUBLICATIONS

Official Communication issued in International Patent Application No. PCT/JP2012/083398, mailed on Apr. 16, 2013.

*Primary Examiner* — April G Gonzales
(74) *Attorney, Agent, or Firm* — Keating & Bennett, LLP

(57) ABSTRACT

In an interface unit, a shield layer includes an aperture through which magnetic flux generated by a power feeding coil of an antenna passes. Since the antenna is smaller than the shield layer, the aperture is much smaller than the shield layer. Thus, noise constituted by electromagnetic waves that travel from inside to outside of a computer via an aperture provided in an upper surface cover is blocked. During communication, the antenna and the shield layer are electromagnetically coupled to each other, and the shield layer defines and functions as an antenna. This allows proper communication with a communication target.

20 Claims, 17 Drawing Sheets

(56) References Cited

U.S. PATENT DOCUMENTS

| | | | | |
|---|---|---|---|---|
| 7,075,558 B2* | 7/2006 | Watanabe | G01C 21/367 | 345/581 |
| 8,610,594 B1* | 12/2013 | Salser, Jr. | G01D 4/002 | 340/870.02 |
| 8,647,519 B1* | 2/2014 | Lin | G06F 3/0412 | 216/13 |
| 8,981,597 B2* | 3/2015 | Urano | H01F 38/14 | 307/104 |
| 2002/0033795 A1* | 3/2002 | Shahoian | G06F 1/1616 | 345/156 |
| 2003/0132917 A1* | 7/2003 | Yuen | G06F 3/03547 | 345/173 |
| 2006/0267961 A1* | 11/2006 | Onoda | G06F 1/1616 | 345/173 |
| 2006/0289284 A1* | 12/2006 | Han | H01H 13/83 | 200/310 |
| 2007/0018849 A1* | 1/2007 | Salser, Jr. | G01D 4/002 | 340/870.02 |
| 2007/0291013 A1* | 12/2007 | Won | G06F 3/03547 | 345/173 |
| 2008/0316051 A1* | 12/2008 | Salser, Jr. | H04Q 9/00 | 340/870.02 |
| 2010/0140249 A1* | 6/2010 | Baier | F24C 15/2021 | 219/412 |
| 2010/0170726 A1* | 7/2010 | Yeh | G06F 3/044 | 178/19.03 |
| 2010/0188359 A1* | 7/2010 | Lee | G06F 3/044 | 345/174 |
| 2010/0251152 A1* | 9/2010 | Cho | G06F 1/1626 | 715/765 |
| 2010/0265211 A1* | 10/2010 | Oishi | G06F 3/044 | 345/174 |
| 2011/0193421 A1* | 8/2011 | Urano | H01F 38/14 | 307/104 |
| 2011/0227799 A1* | 9/2011 | Hashimoto | H01Q 1/2225 | 343/702 |
| 2012/0212444 A1* | 8/2012 | Miyazaki | G06F 3/04886 | 345/173 |
| 2012/0313901 A1* | 12/2012 | Monson | G06F 3/0418 | 345/178 |
| 2013/0076669 A1* | 3/2013 | Ando | G06F 3/04886 | 345/173 |
| 2013/0201126 A1* | 8/2013 | Mimura | G06F 3/0488 | 345/173 |
| 2014/0118275 A1* | 5/2014 | Ito | G06F 3/04886 | 345/173 |
| 2014/0159974 A1* | 6/2014 | Kato | H01Q 1/38 | 343/788 |

FOREIGN PATENT DOCUMENTS

| | | |
|---|---|---|
| JP | 2004-204123 A | 7/2004 |
| JP | 2006-299167 A | 11/2006 |
| JP | 2010-102531 A | 5/2010 |
| JP | 2011-002949 A | 1/2011 |
| JP | 2011-004076 A | 1/2011 |
| JP | 2011-199343 A | 10/2011 |
| JP | 4941600 B2 | 5/2012 |
| JP | 2012-131933 A | 7/2012 |
| JP | 2012-134474 A | 7/2012 |
| JP | 2012-135020 A | 7/2012 |
| JP | 2013-035268 A | 2/2013 |

* cited by examiner

INTERFACE UNIT AND COMPUTER

BACKGROUND OF THE INVENTION

1. Field of the Invention

The present invention relates to an interface unit and a computer.

2. Description of the Related Art

With developments in communication networks represented by the Internet and encryption technologies, transmission and reception of information through the networks have been increasing. In communication through the networks, a personal computer is principally used as an interface that receives input of information from the user. Accordingly, there have been proposed various techniques of improving convenience of the computer used as the interface (see, for example, Japanese Unexamined Patent Application Publication No. 2011-4076).

A notebook personal computer disclosed in Japanese Unexamined Patent Application Publication No. 2011-4076 includes an antenna coil provided integrally with a touchpad. In this notebook personal computer, near field wireless communication based on the NFC (Near Field Communication) standards is performed using the antenna coil. For this reason, transmission of information registered on an IC card and payment with electronic money are carried out by easy operations.

Further, in the notebook personal computer disclosed in Japanese Unexamined Patent Application Publication No. 2011-4076, the antenna is provided integrally with the touchpad. For this reason, even when a housing of the notebook personal computer is made of metal, information recorded on the IC card can be properly read via the touchpad.

The notebook personal computer disclosed in Japanese Unexamined Patent Application Publication No. 2011-4076 includes a ground electrode layer that blocks electromagnetic waves that constitutes noise passing through the touchpad. The ground electrode layer is patterned in a mesh form to realize near field wireless communication. For this reason, it is difficult to sufficiently block electromagnetic waves emitted from the notebook personal computer to the outside and electromagnetic waves entering the inside of the notebook personal computer from the outside.

SUMMARY OF THE INVENTION

Preferred embodiments of the present invention properly perform near field wireless communication with an external apparatus while sufficiently blocking electromagnetic waves.

An interface unit according to a first aspect of various preferred embodiments of the present invention is an interface unit including an electrostatic capacity type pointing device having one surface defining and serving as an input surface. The interface unit includes a pair of electrodes of the pointing device, a shield disposed on one of the pair of electrodes and having an opening, and a power feeding coil being smaller than the shield and electromagnetically coupled to the shield.

The power feeding coil preferably is arranged such that a coil aperture overlaps with the opening provided in the shield.

The power feeding coil may be completely aligned with the shield.

The opening of the shield preferably is filled with a magnetically permeable substance.

The opening of the shield preferably includes an aperture provided in the shield and a slit extending from the aperture to an outer edge of the shield.

The opening of the shield preferably includes a slit provided in the shield.

The shield preferably is a conductor pattern provided on a substrate on which the electrodes are provided.

The power feeding coil preferably is provided on a surface of the substrate opposite from a surface on which the conductor pattern is provided.

The shield preferably is a metal plate.

The shield preferably includes an upper surface and a lower surface, and the power feeding coil preferably is disposed on the upper surface.

The power feeding coil preferably is located between the electrodes and the shield.

The interface unit preferably includes a substrate on which the electrodes are provided, the substrate including an upper surface and a lower surface, the electrodes and the shield preferably are provided on the upper surface of the substrate, the power feeding coil preferably is provided on the lower surface of the substrate, and the shield preferably is provided over an entire upper surface of the substrate.

The power feeding coil preferably defines a chip antenna.

The pointing device preferably is a touchpad.

The opening preferably is provided at a position so as not to overlap with the input surface.

A computer according to a second aspect of various preferred embodiments of the present invention includes the interface unit according to the first aspect of various preferred embodiments of the present invention, and a communication unit configured to communicate with an external apparatus via the interface unit.

The computer preferably includes a metal housing including an aperture from which the input surface of the interface unit is exposed.

A clearance of a predetermined distance preferably is provided between an outer edge of the aperture provided in the housing and an outer edge of the input surface exposed from the aperture.

Various preferred embodiments of the present invention provide the shield having the opening, and the power feeding coil smaller than the shield. Since the power feeding coil and the shield are electromagnetically coupled and cooperate with each other, it is possible to properly communicate with a communication target located on the side of the input surface of the pointing device. Further, the power feeding coil is smaller than the shield. For this reason, electromagnetic waves are effectively blocked while realizing proper communication by making the opening of the shield small.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Preferred embodiments of the present invention will be described below with reference to the drawings. In the description, an XYZ coordinate system defined by an X-axis, a Y-axis, and a Z-axis, which are orthogonal to one another, is used for convenience.

Figure 1:
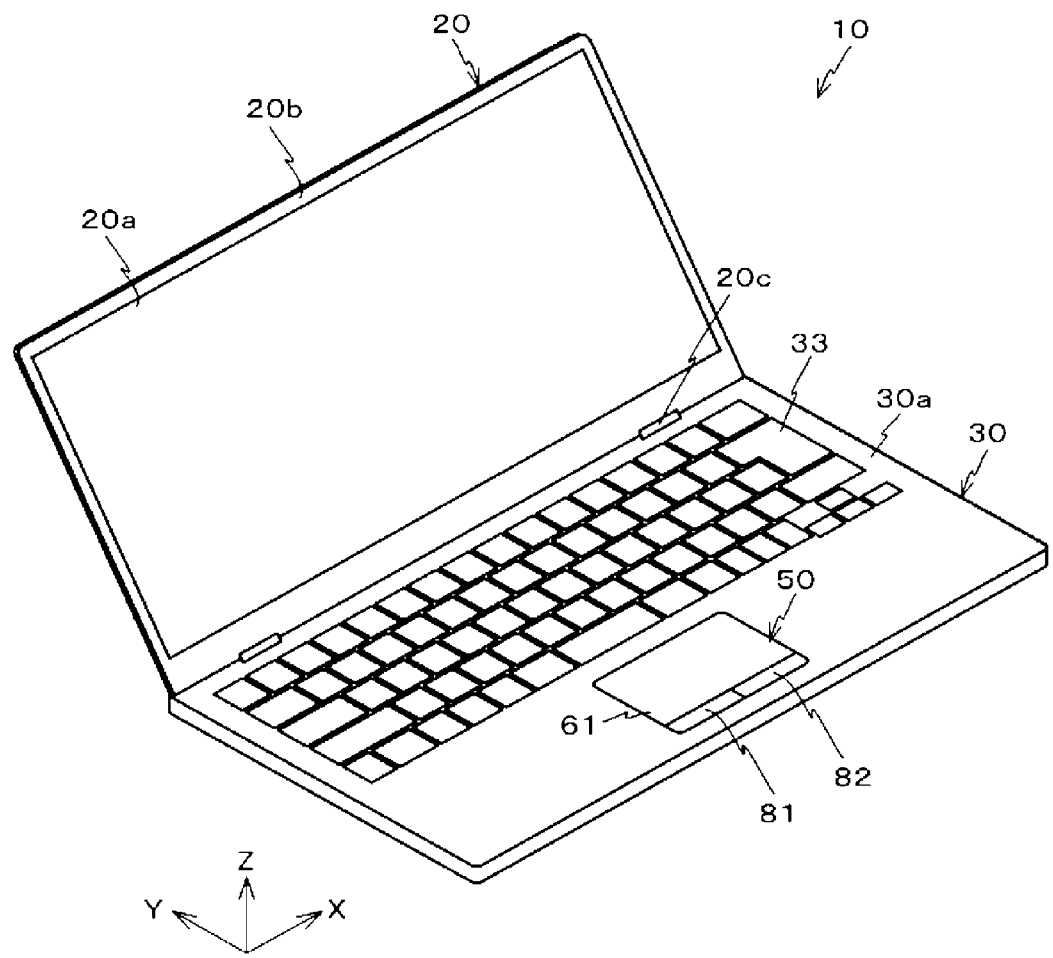
FIG. 1 is a perspective view of a computer according to a preferred embodiment of the present invention.

FIG. 1 is a perspective view of a computer 10 according to a preferred embodiment of the present invention. The computer 10 preferably is a notebook personal computer including a base unit 30 including a housing 30a, and a display unit 20 attached to the base unit 30.

The display unit 20 includes a rectangular or substantially rectangular liquid crystal display 20a whose longitudinal direction is an X-axis direction, and a metal housing 20b that houses the liquid crystal display 20a. The display unit 20 is attached to the base unit 30 by hinges 20c. For this reason, the display unit 20 can turn up and down relative to the base unit 30.

Figure 2:
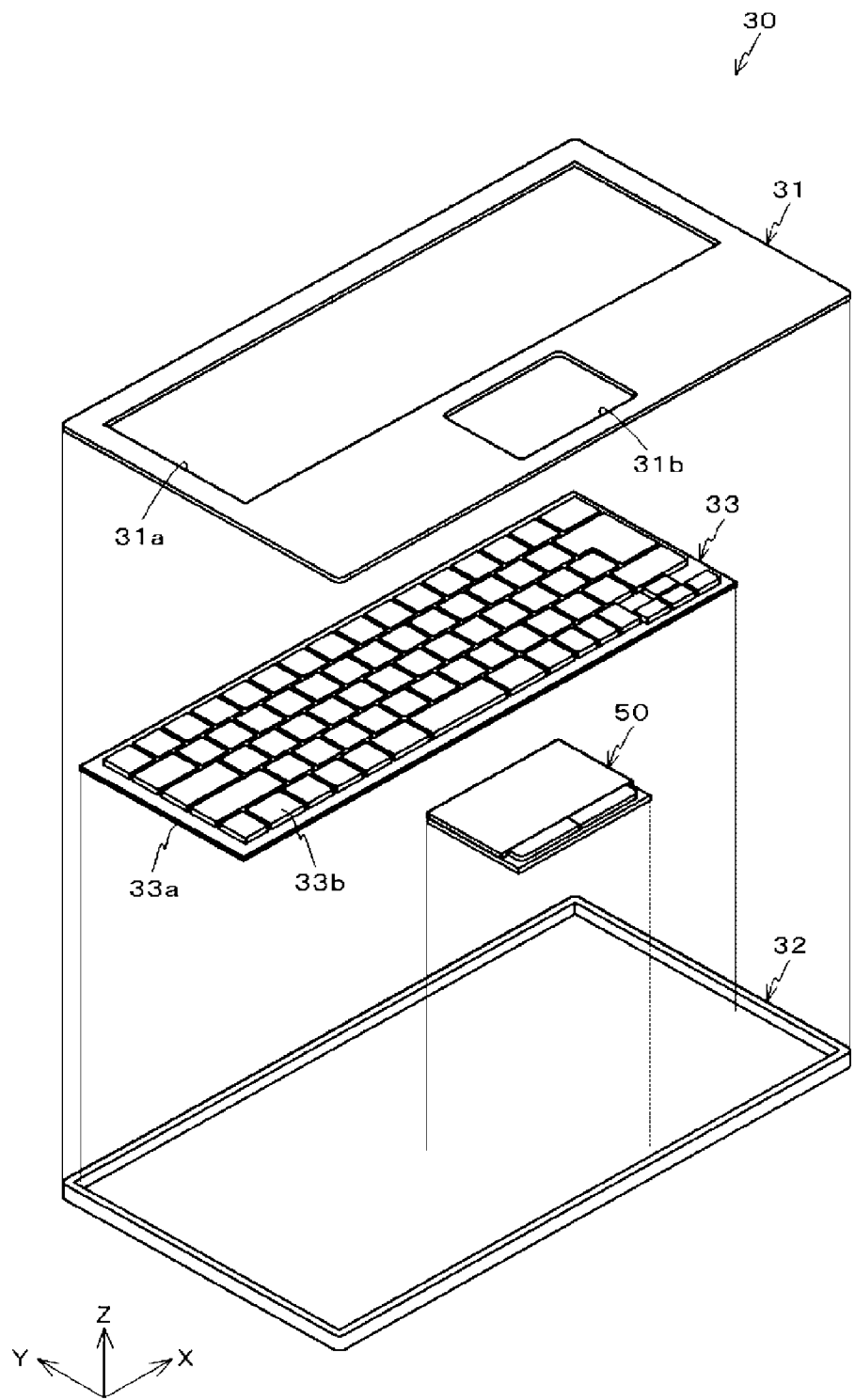
FIG. 2 is an exploded perspective view of a base unit.

FIG. 2 is an exploded perspective view of the base unit 30 that constitutes the computer 10. As illustrated in FIG. 2, the base unit 30 includes a case 32 and an upper surface cover 31 that constitute the housing 30a, a key unit 33, and an interface unit 50.

The upper surface cover 31 is a rectangular or substantially rectangular cover whose longitudinal direction is the X-axis direction. The upper surface cover 31 has an aperture 31a from which key tops 33b of the key unit 33 are exposed, and an aperture 31b from which an upper surface of the interface unit 50 is to be exposed. As the material of the upper surface cover 31, metal, such as an aluminum or stainless steel plate, can be used.

The case 32 is an open-top rectangular or substantially rectangular case whose longitudinal direction is the X-axis direction. As the material of the case 32, metal, such as aluminum, can be used, similarly to the upper surface cover 31.

The key unit 33 includes a base 33a and a plurality of key tops 33b arranged on an upper surface (Z-axis direction side surface) of the base 33a. The base 33a is a substrate having an electric circuit, and switches are mounted on a surface to be actuated by the press of the key tops 33b. The key unit 33 is horizontally supported within the case 32.

Figure 3:
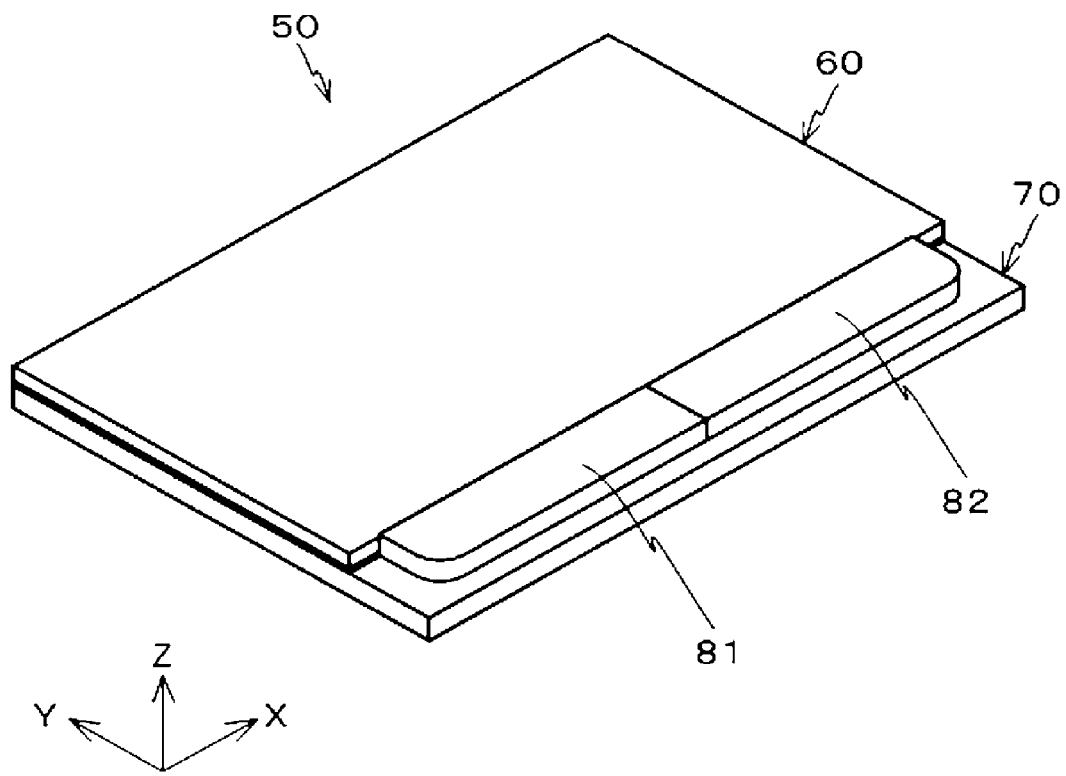
FIG. 3 is a perspective view of an interface unit.

FIG. 3 is a perspective view of the interface unit 50. As illustrated in FIG. 3, the interface unit 50 includes a substrate 70 including an antenna 80 (see FIG. 5) mounted on a lower surface thereof, a touchpad (pointing device) 60, and key switches 81 and 82. In FIG. 3, an upper surface (Z-axis direction side surface) of the touchpad 60 defines an input surface.

Figure 4:
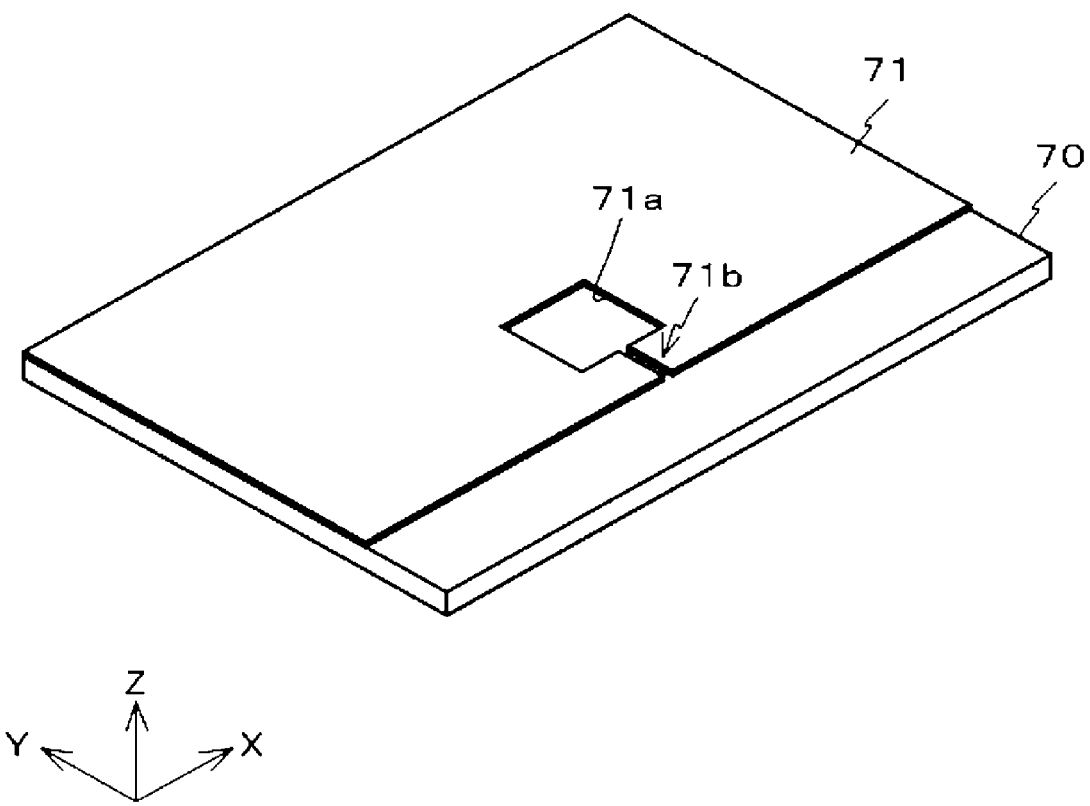
FIG. 4 is a perspective view of a substrate.

FIG. 4 is a perspective view of the substrate 70. As illustrated in FIG. 4, the longitudinal direction of the substrate 70 is the X-axis direction. The substrate 70 is preferably made of epoxy resin. On an upper surface of the substrate 70, a shield layer (shield) 71 is provided.

The shield layer 71 is shaped to have almost the same size as that of the touchpad 60. A square or substantially square aperture (opening) 71a is provided at a position slightly shifted from the center portion of the shield layer 71 in a direction opposite from the Y-axis direction. The shield layer 71 also includes a slit 71b (opening) extending from the aperture 71a toward a front side (side opposite from the Y-axis direction side) of the shield layer 71 along a Y-axis direction outer edge of the shield layer 71. The aperture 71a is provided such that magnetic flux generated by an antenna 80 passes therethrough. The slit 71b is provided to reduce eddy current generated around the aperture 71a by the magnetic flux passing through the aperture 71a. This shield layer 71 is formed preferably by edging copper foil stuck on the upper surface of the substrate 70.

Figure 5:
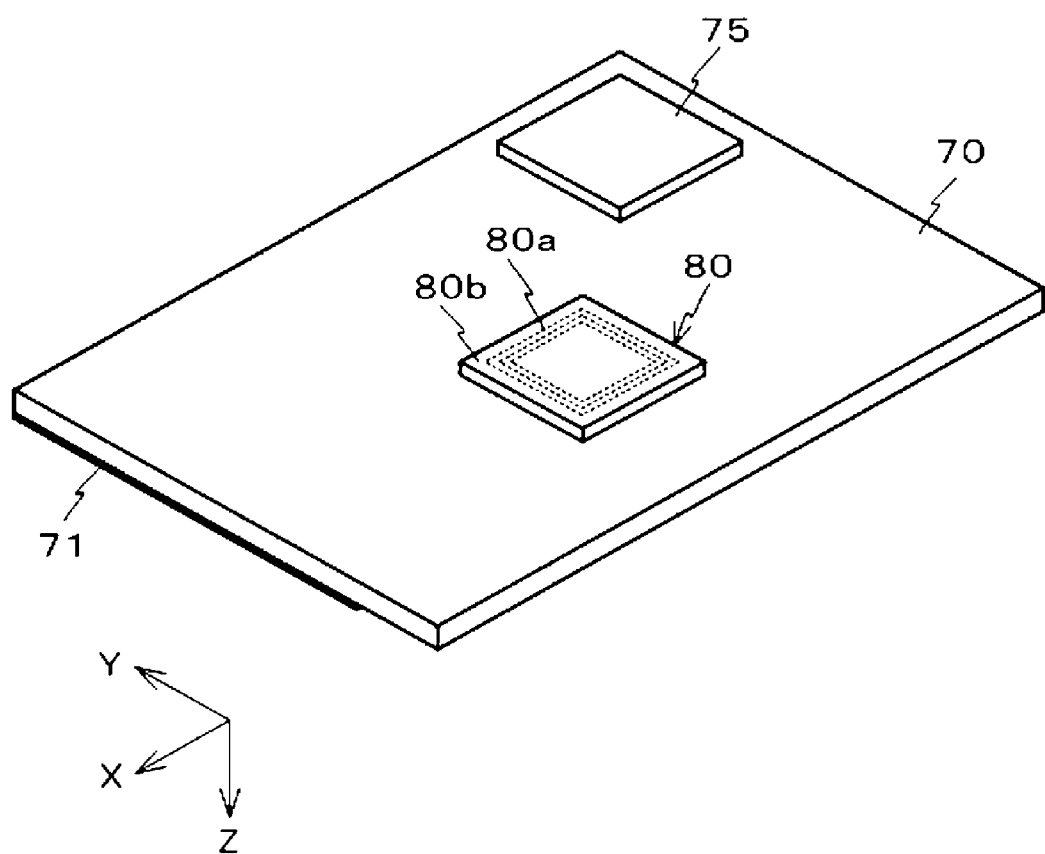
FIG. 5 is a perspective view of a lower surface of the substrate.

FIG. 5 is a perspective view of a lower surface (Z-axis direction side surface) of the substrate 70. As illustrated in FIG. 5, an IC chip 75 electrically coupled to the touchpad 60, and an antenna 80 are mounted on the lower surface of the substrate 70.

The antenna 80 includes a power feeding coil 80a having a center axis AX parallel or substantially parallel to the Z-axis, and a film 80b covering the power feeding coil 80a. In the antenna 80, the center axis AX of the power feeding coil 80a coincides with a center C1 of the antenna 80. As illustrated in a plan view of FIG. 6, the antenna 80 is mounted on the substrate 70 in a state in which the center C1 of the antenna 80 in an XY-plane coincides with a center C2 of the aperture 71a provided in the shield layer 71.

Figure 7:
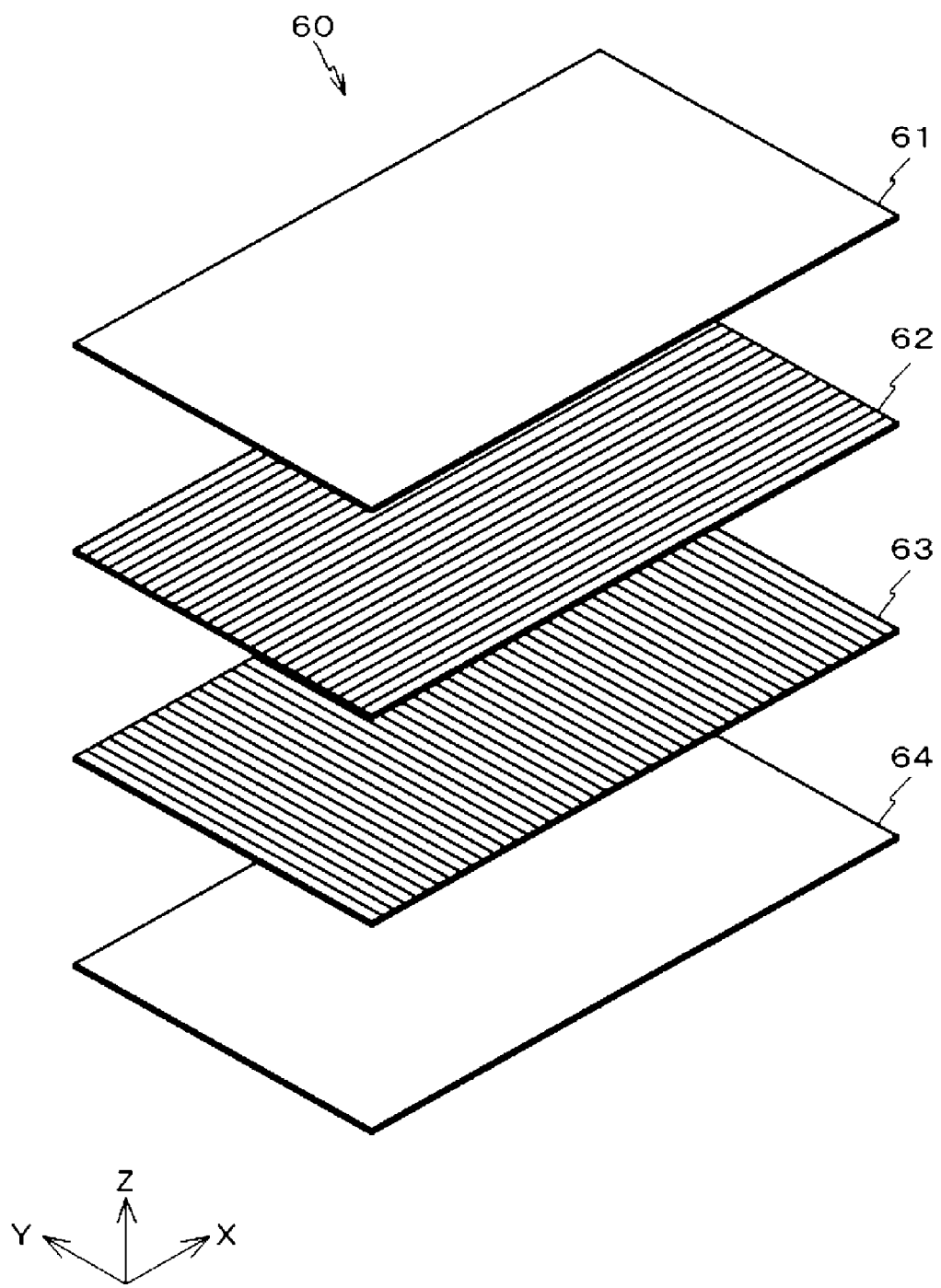
FIG. 7 is an exploded perspective view of a touchpad.

FIG. 7 is an exploded perspective view of the touchpad 60. As illustrated in FIG. 7, the touchpad 60 includes a protective sheet 61 to be exposed from the aperture 31b of the upper surface cover 31 (see FIG. 2), a pair of electrode sheets (electrodes) 62 and 63, and an insulating sheet 64.

The protective sheet 61 is a rectangular or substantially rectangular sheet whose longitudinal direction is the X-axis direction. For example, the protective sheet 61 is preferably formed of glass or resin coated with a glass coating agent.

The insulating sheet 64 is a sheet having the same or substantially the same shape as that of the protective sheet 61. As the insulating sheet 64, a prepreg can be used as an example.

Figure 8:
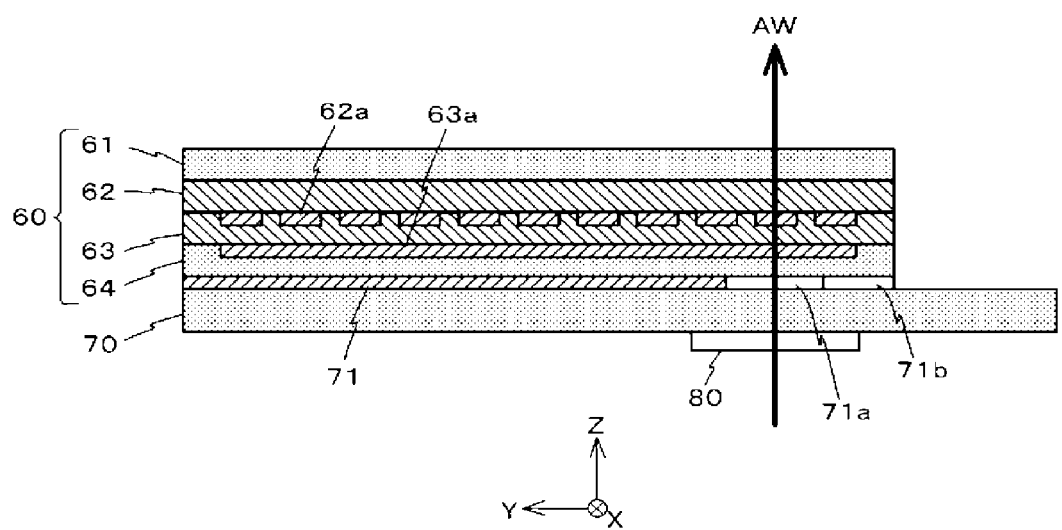
FIG. 8 illustrates cross sections of the touchpad and the substrate.

FIG. 8 schematically illustrates cross sections of the touchpad 60 and the substrate 70. The electrode sheets 62 and 63 are resin films that have the same or substantially the same shape as that of the protective sheet 61. As illustrated in FIG. 8, a plurality of electrode patterns 62a, whose longitudinal direction is the X-axis direction, are arranged at regular intervals in the Y-axis direction on a lower surface of the electrode sheet 62. Further, a plurality of electrode patterns 63a, whose longitudinal direction is the Y-axis direction, are arranged at regular intervals in the X-axis direction on a lower surface of the electrode sheet 63.

The protective sheet 61, the electrode sheets 62 and 63, and the insulating sheet 64 are combined with the substrate 70 by the following method. That is, as illustrated in FIG. 8, the operator stacks the protective sheet 61, the electrode sheets 62 and 63, and the insulating sheet 64 described above in order on the shield layer 71 provided on the substrate 70. Then, the operator presses these sheets 61 to 64 together with the substrate 70 to combine the sheets 61 to 64 and the substrate 70. Thus, the touchpad 60 of an electrostatic capacity type is provided on the upper surface of the substrate 70. When the operator mounts the IC chip 75 and the antenna 80 (see FIG. 5) on the lower surface of the substrate 70 and mounts the key switches 81 and 82 (see FIG. 3) on the upper surface of the substrate 70, the interface unit 50 illustrated in FIG. 3 is completed.

Figure 9:
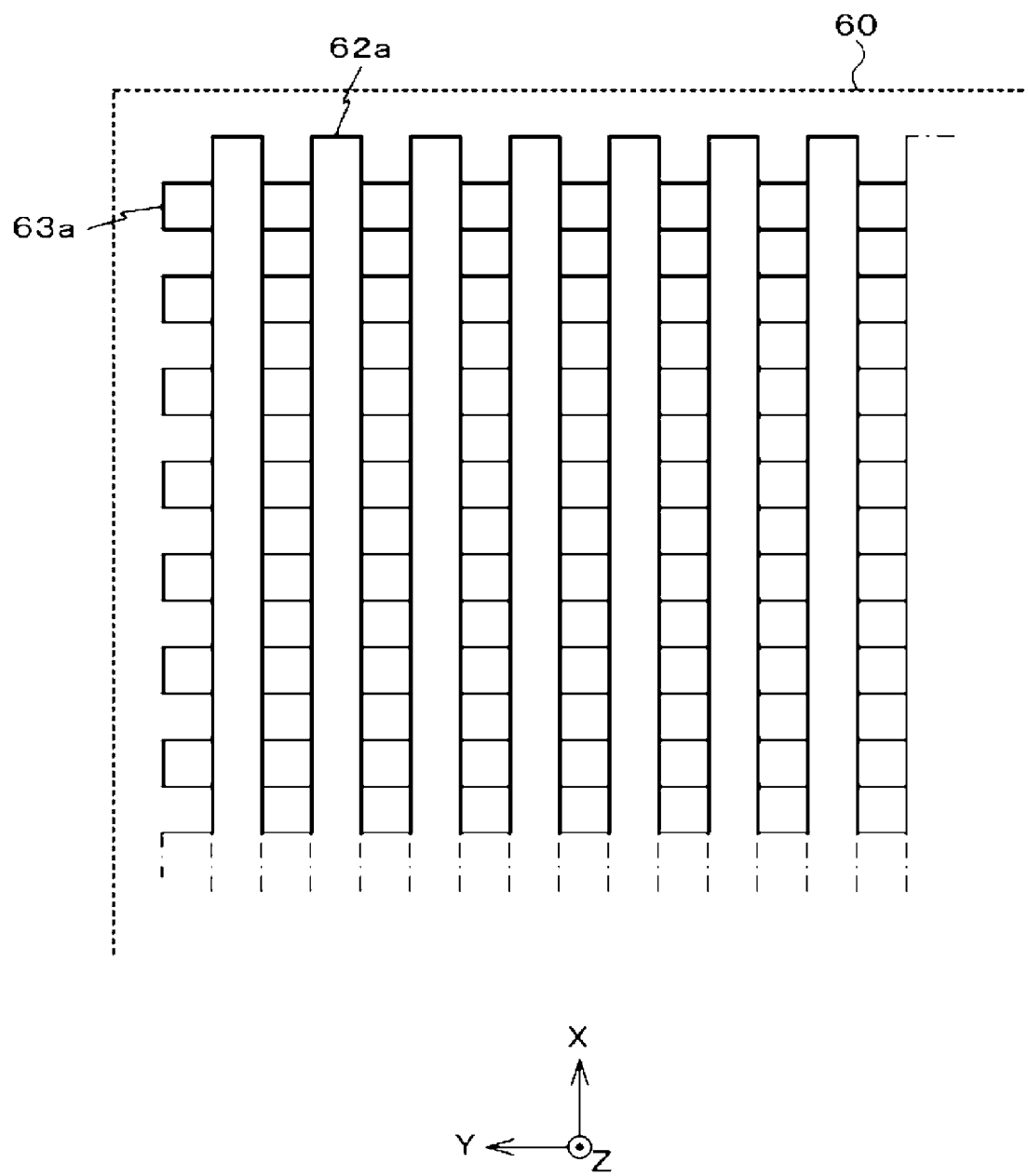
FIG. 9 illustrates electrode patterns.

As illustrated in FIG. 9, the touchpad 60 includes the electrode patterns 63a arranged at regular intervals in the X-axis direction, and the electrode patterns 62a opposed to the electrode patterns 63a in the Z-axis direction and arranged at regular intervals in the Y-axis direction. The width of the electrode patterns 62a and 63a is sufficiently smaller than the aperture diameter of the power feeding coil 80a (see FIG. 5). Further, since the electrode patterns 62a and 63a are opposed to each other in the Z-axis direction, they define and function as a capacitor. For this reason, the electrode patterns 62a and 63a are mutually insulated with respect to direct current. For this reason, eddy current generated by a magnetic field acting on the electrode patterns 62a and 63a does not flow between the different electrode patterns.

Therefore, magnetic flux from the antenna 80 is rarely influenced by the eddy current generated in the electrode patterns 62a and 63a, and reaches a communication target located above the interface unit 50 via gaps between the electrode patterns 62a and gaps between the electrode patterns 63a.

In the interface unit 50, the electrode patterns 62a and 63a of the electrode sheets 62 and 63 and contacts of the key switches 81 and 82 are coupled to the IC chip 75. For this reason, when the touchpad 60 and the key switches 81 and 82 are operated by the user, signals in accordance with the operation contents are output from the IC chip 75.

Figure 6:
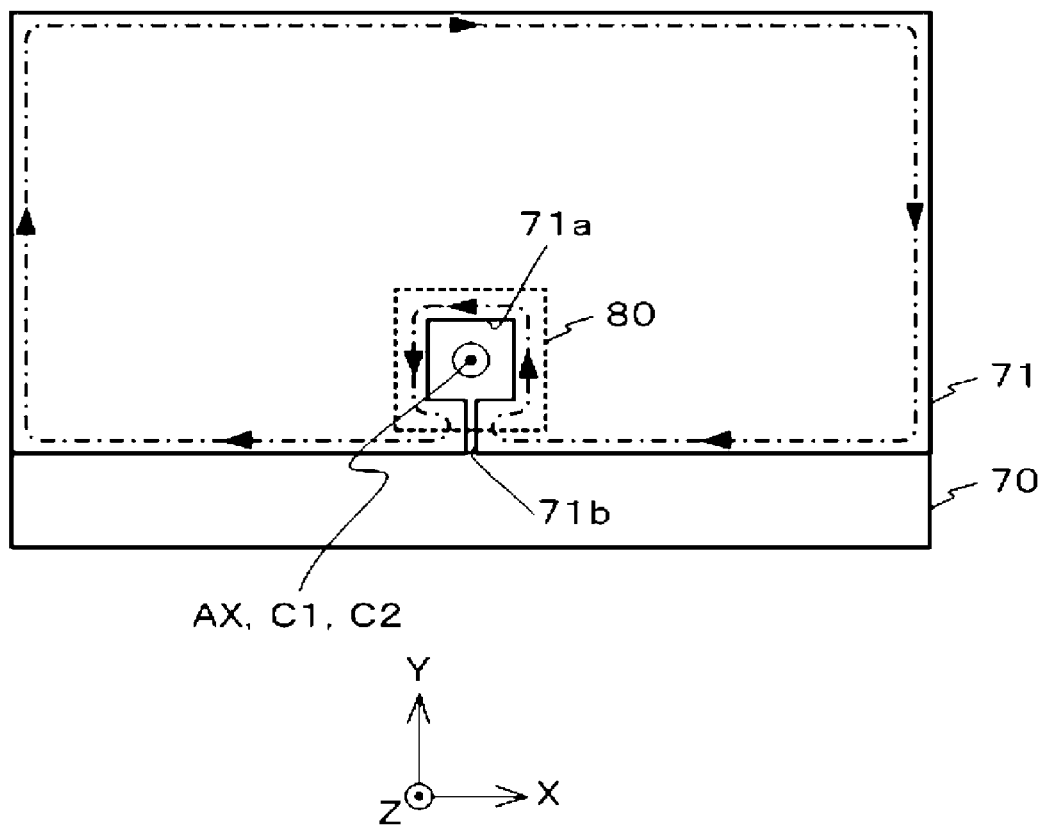
FIG. 6 is a plan view of the substrate.

In the interface unit 50 having the above-described structure, when current flows in a counterclockwise direction in FIG. 5 through the power feeding coil 80a (see FIG. 5) of the antenna 80, magnetic flux is generated by the current, as shown by arrow AW in FIG. 8. As shown by arrow Aw, this magnetic flux penetrates the resin substrate 70, and passes through the aperture 71a provided in the shield layer 71. When the magnetic flux passes through the aperture 71a, eddy current occurs around the aperture 71a. As illustrated in FIG. 6, the shield layer 71 includes the slit 71b extending from the aperture 71a along the outer edge of the shield layer 71. For this reason, the eddy current generated around the aperture 71a is caused by an edge effect to flow along the outer edge of the aperture 71a and the outer edge of the shield layer 71, as shown by an imaginary line of FIG. 6.

The eddy current flowing along the outer edge of the aperture 71a flows in a direction to cancel the magnetic flux generated by the antenna 80, that is, in a direction opposite from the direction of the current flowing through the power feeding coil 80a that constitutes the antenna 80. In contrast, the eddy current flowing along the outer edge of the shield layer 71 flows in the same direction as that of the current flowing through the power feeding coil 80a. For this reason, although there is an influence of the eddy current flowing along the outer edge of the aperture 71a, the shield layer 71 functions equivalently to an antenna having the same size as that of the shield layer 71 because of interaction between the eddy current flowing along the outer edge of the shield layer 71 and the current flowing through the power feeding coil 80a. For this reason, in the interface unit 50, even when the shield layer 71 for originally blocking the electromagnetic waves serving as noise is opposed to the communication target, information can be transmitted to the communication target.

When the shield layer 71 receives a magnetic field generated by the communication target, eddy current similarly flows along the outer edge of the shield layer 71, and magnetic flux from the communication target passes via the aperture 71a through the aperture (coil aperture) of the power feeding coil 80a that constitutes the antenna 80. In this case, the magnetic flux passing through the aperture of the power feeding coil 80a is intensified by the eddy current flowing along the outer edge of the shield layer 71. For this reason, in the interface unit 50, even when the shield layer 71 configured to block the electromagnetic waves serving as noise is opposed to the communication target, information can be received from the communication target. The above-described technique is disclosed in detail in Japanese Patent No. 4941600.

As is understood by reference to FIG. 2, the operator disposes the interface unit 50 within the case 32 together with the key unit 33. Then, the operator attaches the upper surface cover to the case 32, so that the base unit 30 of the computer 10 can be assembled. In the interface unit 50 contained in the housing including the case 32 and the upper surface cover 31, as illustrated in FIG. 1, the protective sheet 61 of the touchpad 60 and the key switches 81 and 82 are exposed from the aperture 31b of the upper surface cover 31.

Figure 10:
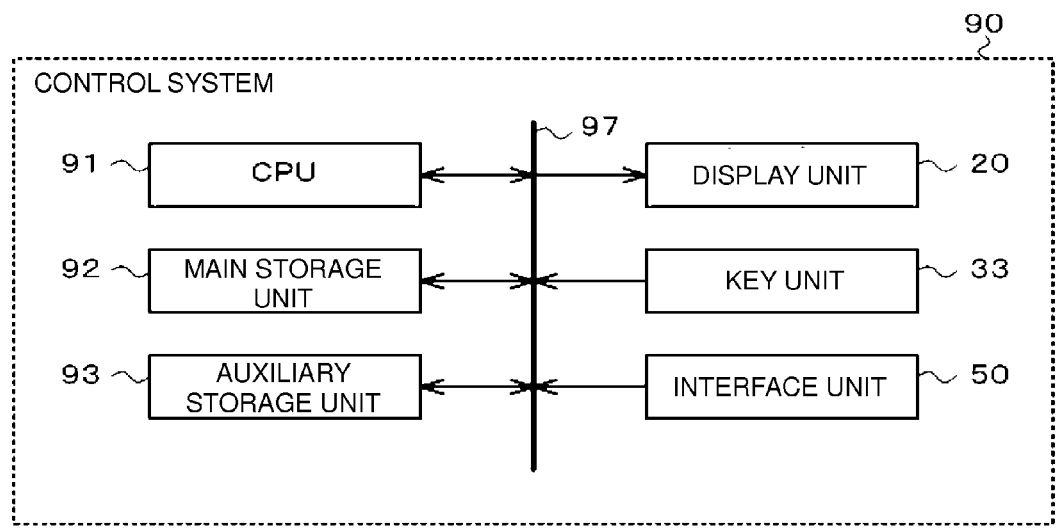
FIG. 10 is a block diagram of a control system of the computer.

FIG. 10 is a block diagram of a control system 90 in the computer 10. The control system 90 includes a CPU (Central Processing Unit; communication unit) 91, a main storage unit 92, and an auxiliary storage unit 93. The CPU (Central Processing Unit) 91, the main storage unit 92, and the auxiliary storage unit 93 are preferably mounted on a motherboard contained in the base unit 30.

The control system 90 further includes the display unit 20, the key unit 33, the interface unit 50, and a bus 97 that connects these units.

The main storage unit 92 includes a RAM (Random Access Memory) or the like, and is used as a work area of the CPU 91.

The auxiliary storage unit 93 includes a nonvolatile memory such as a ROM (Read Only Memory) or a semi-conductor memory. The auxiliary storage unit 93 stores programs to be executed by the CPU 91 and various parameters including a parameter for performing near field wireless communication.

The display unit 20 displays a result of processing of the CPU 91 and information required by the user.

The key unit 33 outputs signals in accordance with the operation of the user to the CPU 91 via the bus 97.

As described above, the interface unit 50 outputs signals in accordance with the contents of the operation of the user to the CPU 91 via the bus 97.

The CPU 91 reads out a program stored in the auxiliary storage unit 93 according to a command from the user. Then, the CPU 91 executes processing in accordance with instructions input through the key unit 33 and the interface unit 50.

Next, a description will be given of a procedure for performing near field communication (NFC) using the computer 10. To perform near field communication using the computer 10, the user first starts an application necessary for communication pre-installed in the computer 10. Current modulated on the basis of information to be transmitted is thus supplied to the power feeding coil 80a of the antenna 80 that constitutes the interface unit 50. Thus, predetermined information is transmitted via the antenna 80 and the shield layer 71 defining and functioning as a booster electrode of the antenna 80.

Figure 11:
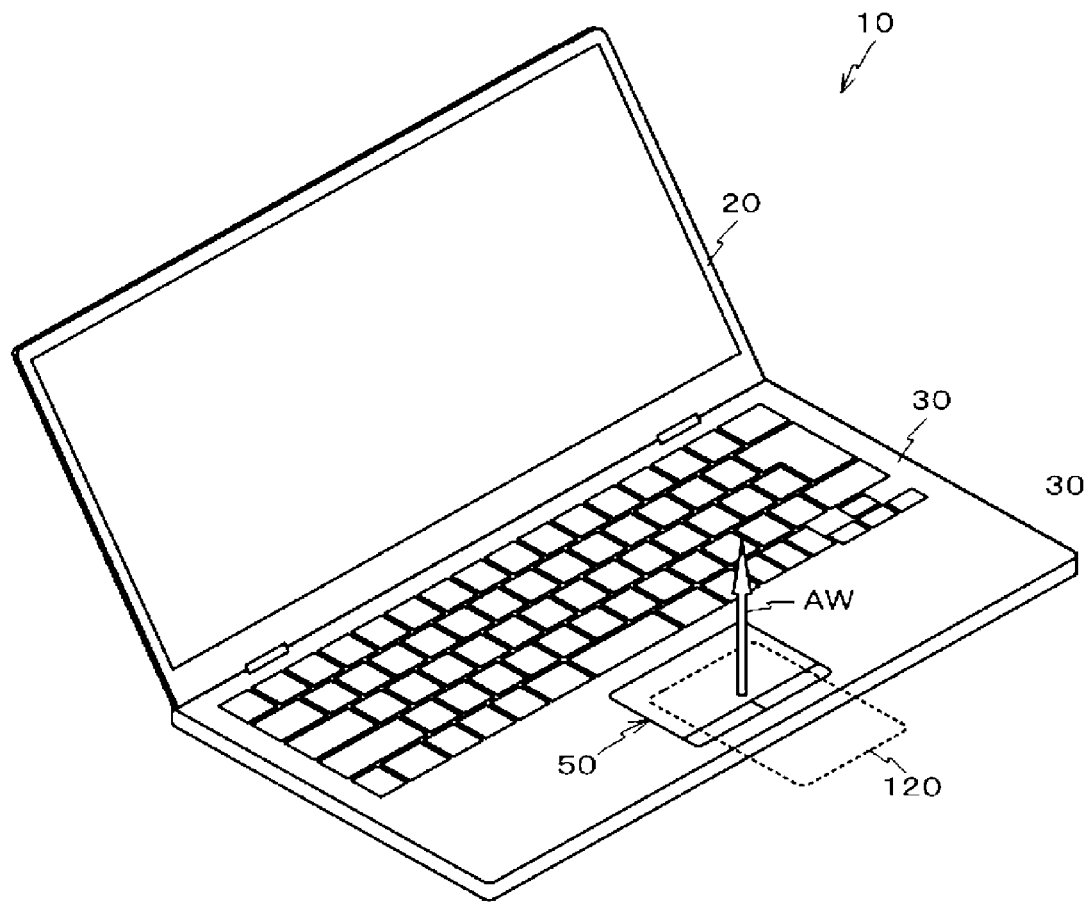
FIG. 11 explains communication operation of the computer.

When a communication target (external apparatus) 120, such as an IC card, is held over the interface unit 50 in this state, for example, as illustrated in FIG. 11, communication is performed between the computer 10 and the communication target 120.

When information is transmitted to the communication target 120, magnetic flux generated by the antenna 80 penetrates the communication target 120, as shown by arrow AW of FIG. 11.

The communication target 120 can receive the information transmitted from the computer 10 by demodulating current induced by the magnetic flux. When the interface unit 50 receives information from the communication target 120, magnetic flux generated by the communication target 120 penetrates the interface unit 50. In this case, eddy current shown by the imaginary line of FIG. 6 is generated along the outer edge of the shield layer 71 of the substrate 70 that constitutes the interface unit 50. Then, the magnetic flux intensified by the eddy current passes through the aperture of the power feeding coil 80a that constitutes the antenna 80. Thus, current demodulated on the basis of the information transmitted from the communication target 120 is induced in the power feeding coil 80a. The CPU 91 receives the information transmitted from the communication target 120 by demodulating the current induced in the power feeding coil 80a.

As described above, in the present preferred embodiment, the substrate 70 on which the touchpad 60 is disposed is provided with the shield layer 71 having almost the same size as that of the touchpad 60. This shield layer 71 has the aperture 71a through which magnetic flux generated by the power feeding coil 80a of the antenna 80 passes. In the present preferred embodiment, the power feeding coil 80a is smaller than the shield layer 71. Hence, the aperture 71a is extremely smaller than the shield layer 71. For this reason, it is possible to sufficiently block electromagnetic waves serving as noise that travel from the inside to the outside of the computer 10 via the aperture 31a provided in the upper surface cover 31.

When current flows through the power feeding coil 80a of the antenna 80 during near field communication using the antenna 80, magnetic flux generated by the antenna 80 passes through the aperture 71a of the shield layer 71. Thus, the antenna 80 and the shield layer 71 are electromagnetically coupled, and the shield layer 71 defines and functions as an antenna configured to transmit information. When magnetic flux from the communication target 120 reaches the interface unit 50 in the computer 10, as shown by the imaginary line of FIG. 6, the magnetic flux intensified by eddy current flowing along the outer edge of the shield layer 71 passes through the aperture of the power feeding coil 80a that constitutes the antenna 80. Thus, the antenna 80 and the shield layer 71 are electromagnetically coupled, and the shield layer 71 functions as an antenna configured to receive information. For this reason, the user possessing the computer 10 properly communicates with the communication target 120.

In the preferred embodiment described above, it is possible to efficiently block noise in the form of electromagnetic waves that are to pass through the touchpad 60 and to properly communicate with the communication target 120 located above the touchpad 60.

While the shield layer 71 provided on the substrate 70 preferably includes the aperture 71a and the slit 71b in the above-described preferred embodiment, most of the shield layer 71 is defined by a thin film having uniform thickness. For example, a thin metal plate can be used as the shield layer 71.

For this reason, stray capacitance between the electrode patterns 62a and the electrode patterns 63a that constitute the touchpad 60 is prevented from being changed by disposing the antenna 80 or the like below the touchpad 60. Thus, the position of the antenna 80 is not limited, and this increases the degree of flexibility in antenna design. Further, even when the user attaches a magnetic sheet to the antenna 80 in order to adjust the inductance of the antenna 80, it does not affect the operation of the touchpad 60.

As described above, since the stray capacitance between the electrode patterns 62a and the electrode patterns 63a that constitute the touchpad 60 does not change in the above-described preferred embodiment, stable operation of the touchpad 60 can be expected.

Figure 12:
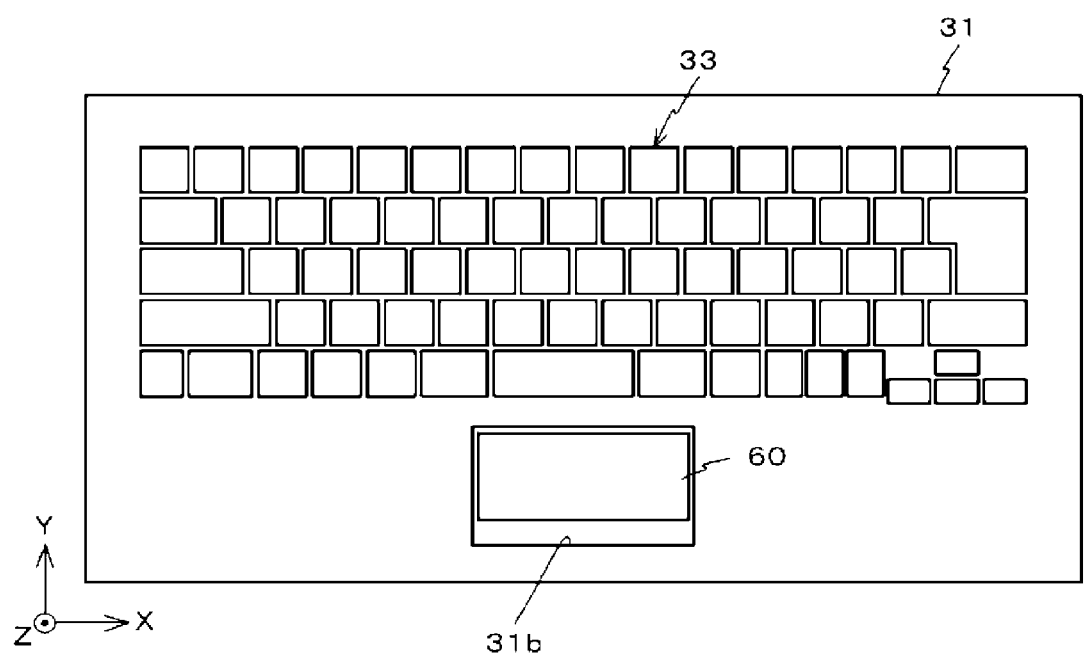
FIG. 12 explains the positional relationship between an upper surface cover and the touchpad.

In the preferred embodiment described above, the upper surface cover 31 preferably is made of metal. For this reason, a clearance is preferably provided between the electrode sheets 62 and 63 of the touch pad 60 and the upper surface cover 31. To form the clearance, in the present preferred embodiment, the interface unit 50 is positioned such that the electrode sheets 62 and 63 are spaced apart downward from the lower surface of the upper surface cover 31. However, alternatively, as illustrated in FIG. 12, the aperture 31b provided in the upper surface cover 31 may be shaped such that the outer edge of the touchpad 60 is spaced horizontally apart from the edge of the aperture 31b.

In the present preferred embodiment, when current flows through the power feeding coil 80a of the antenna 80, the shield layer 71 functions equivalently to the antenna of the same size as that of the shield layer 71 because of interaction between eddy current flowing along the edge portion of the shield layer 71 and current flowing through the power feeding coil 80a. For this reason, even when the size of the antenna 80 is reduced, an effective communication region of a certain size is ensured.

In the present preferred embodiment, the user possessing the computer 10 reliably communicates with the communication target 120 via the touchpad 60. For this reason, a metal material, such as aluminum or stainless steel, preferably is used as the housing 20b of the computer 10. This increases the degree of flexibility in design of the computer 10.

Figure 13:
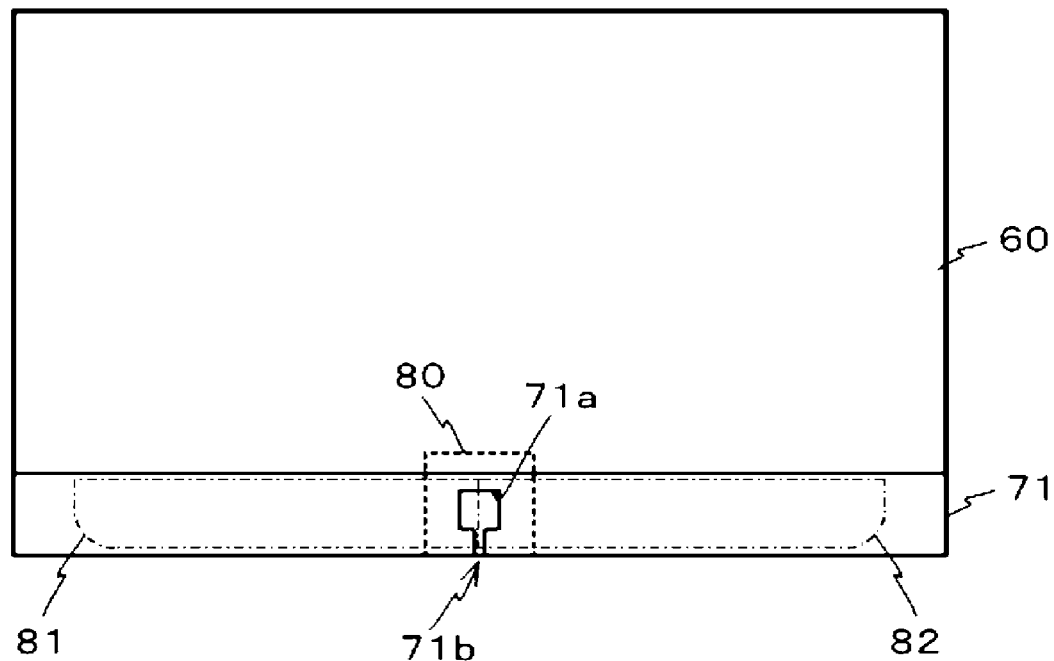
FIG. 13 illustrates a modification of a shield layer.

While a preferred embodiment of the present invention has been described above, the present invention is not limited by the above preferred embodiment. For example, in the above-described preferred embodiment, the shield layer 71 preferably is provided only between the substrate 70 and the touchpad 60, as illustrated in FIG. 8. Alternatively, the shield layer 71 may be provided on the entire upper surface of the substrate 70, as illustrated in FIG. 13. In this case, the aperture 71a and the slit 71b preferably do not overlap with the touchpad 60. Thus, stray capacitance between the electrode patterns 62a and 63a that constitute the touchpad 60 preferably are uniform through the entire touchpad. Therefore, the operating accuracy of the touchpad 60 is increased.

Figure 14:
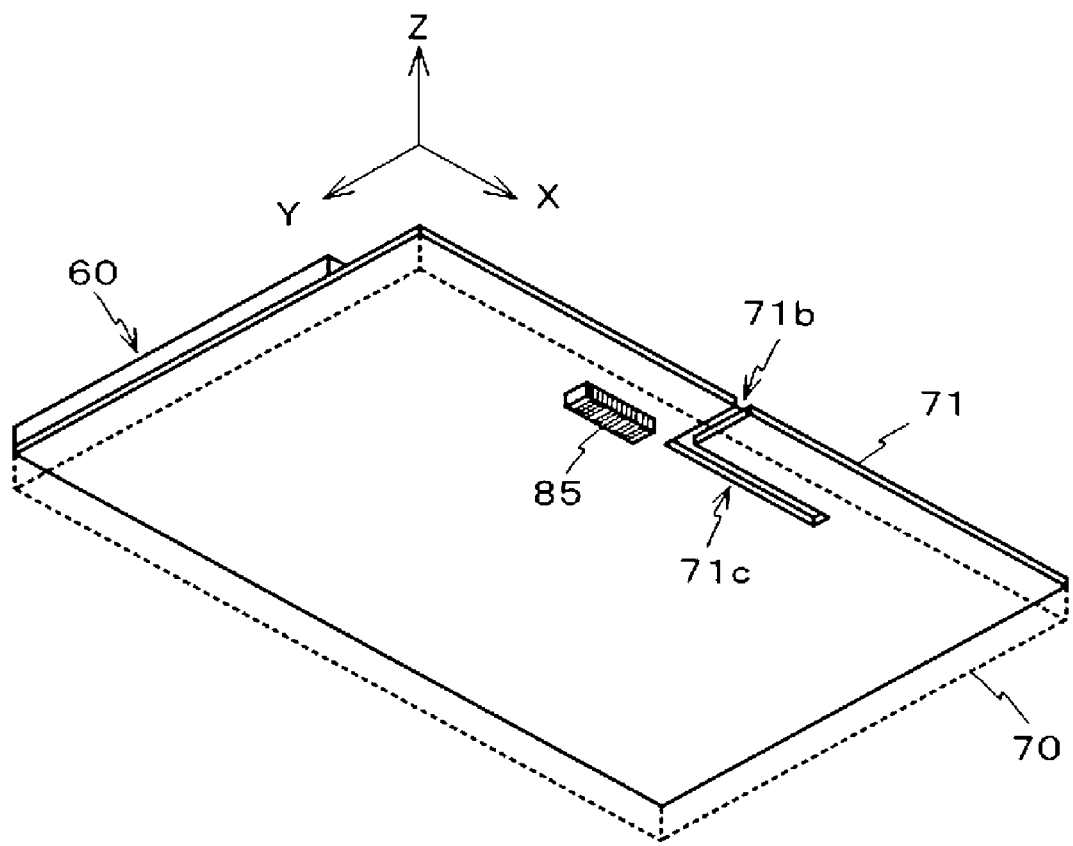
FIG. 14 illustrates modifications of a shield layer and an antenna.

In the above-described preferred embodiment, the interface unit 50 preferably includes the antenna 80 including the power feeding coil 80a whose center axis AX is parallel or substantially parallel to the Z-axis. Alternatively, as the antenna of the interface unit 50, for example, a chip antenna 85 including a power feeding coil whose center axis AX is parallel or substantially parallel to the X-axis may be used. In this case, for example, as illustrated in FIG. 14, it is conceivable to provide a slit 71*b* parallel to the Y-axis and a slit 71*c* parallel to the X-axis in the shield layer 71 of the substrate 70 and to dispose the chip antenna 85 on a side of the slit 71*b* opposite from the X-axis direction.

Figure 15:
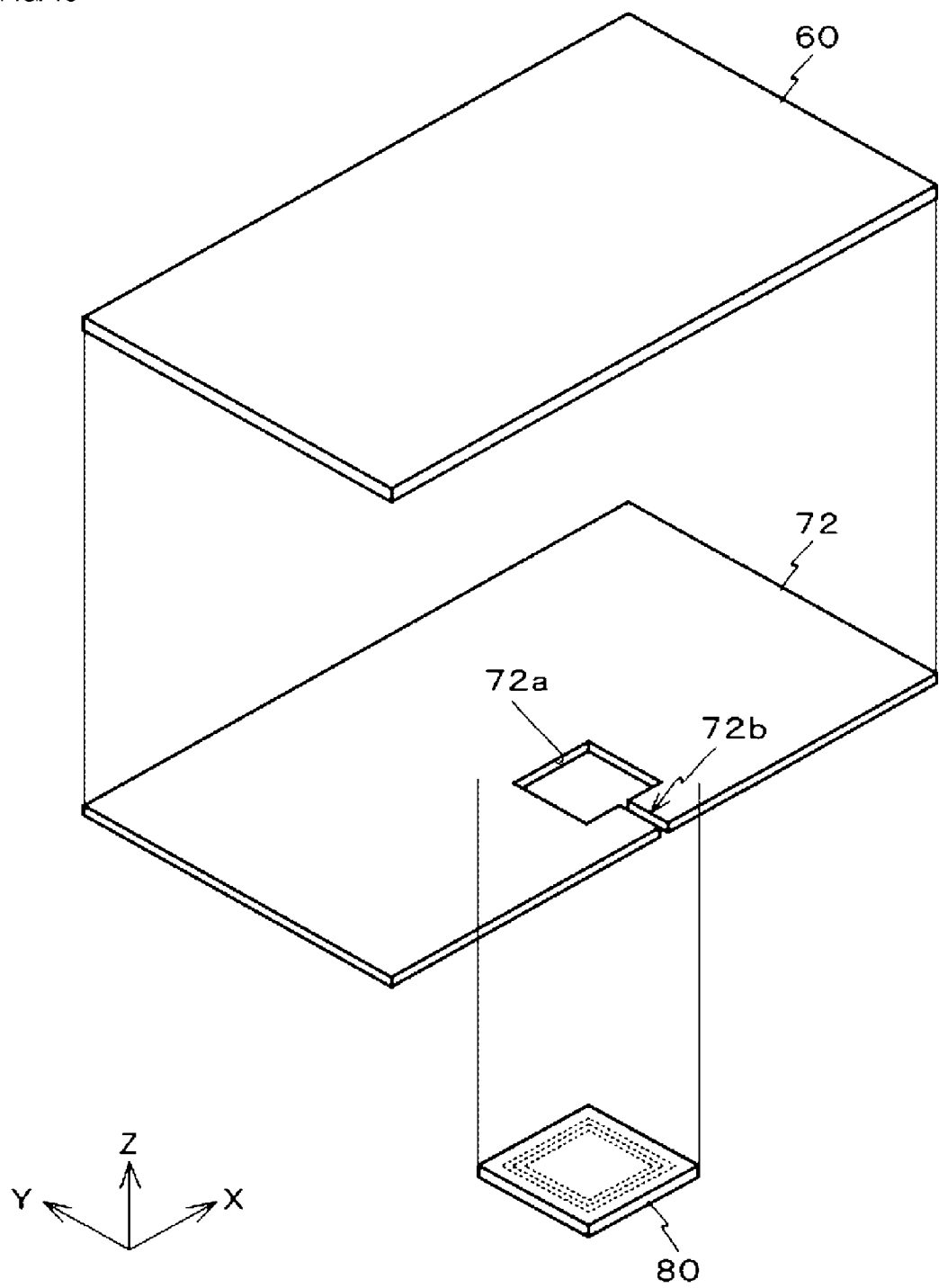
FIG. 15 illustrates a shield plate together with the touchpad and the antenna.

In the above-described preferred embodiment, the shield layer 71 preferably is provided on the substrate 70 that constitutes the interface unit 50. Alternatively, the interface unit 50 may include a shield plate 72 that functions equivalently to the shield layer 71. FIG. 15 illustrates an example of a shield plate 72. The shield plate 72 preferably is a member made of a metal such as aluminum, a zinc-coated steel plate, or a stainless steel plate, for example. Similarly to the shield layer 71, the shield plate 72 includes an aperture 72*a* and a slit 72*b*. As is understood by reference to FIG. 15, the touchpad 60 is attached to an upper surface of the shield plate 72, and the antenna 80 is attached to a lower surface of the shield plate 72.

Figure 16:
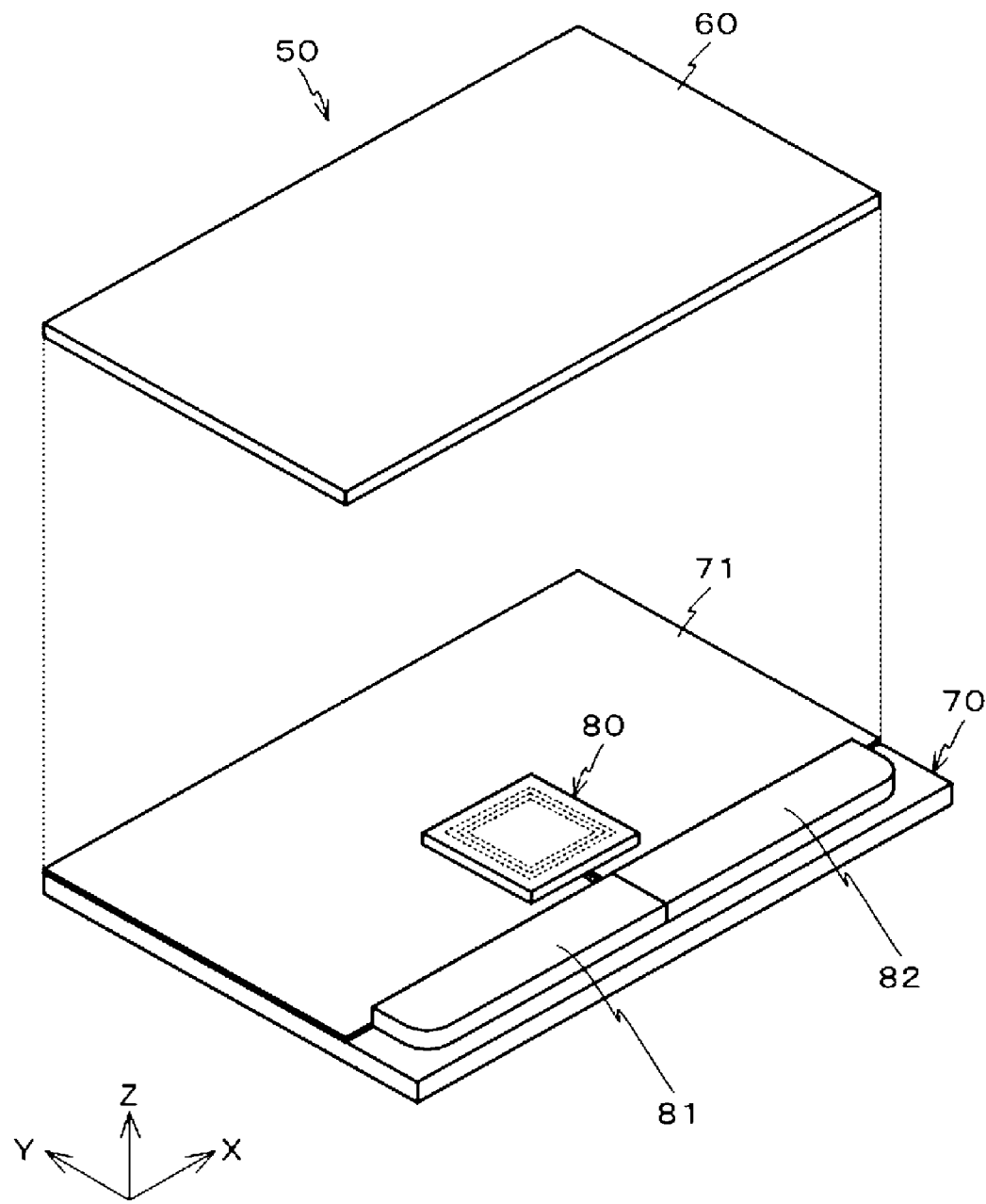
FIG. 16 illustrates a modification of an interface unit.

In the above-described preferred embodiment, as illustrated in FIG. 5, the antenna 80 preferably is mounted on the lower surface of the substrate 70 (surface opposite from the Z axis direction side). Alternatively, as illustrated in FIG. 16, the antenna 80 preferably is mounted on the upper surface of the shield layer 71 provided on the substrate 70.

In the above-described preferred embodiment, the interface unit 50 preferably is provided in the notebook personal computer, for example. Alternatively, the interface unit 50 may be provided in a computer, such as a touchpad, a communication apparatus, and the like, for example.

Figure 17:
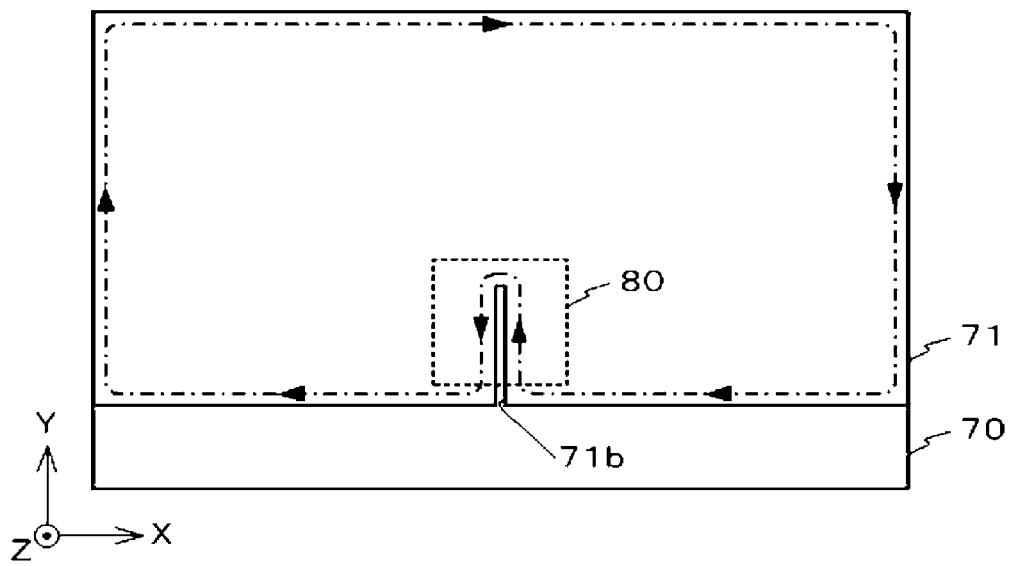
FIG. 17 illustrates a slit provided in the shield layer.
Figure 18:
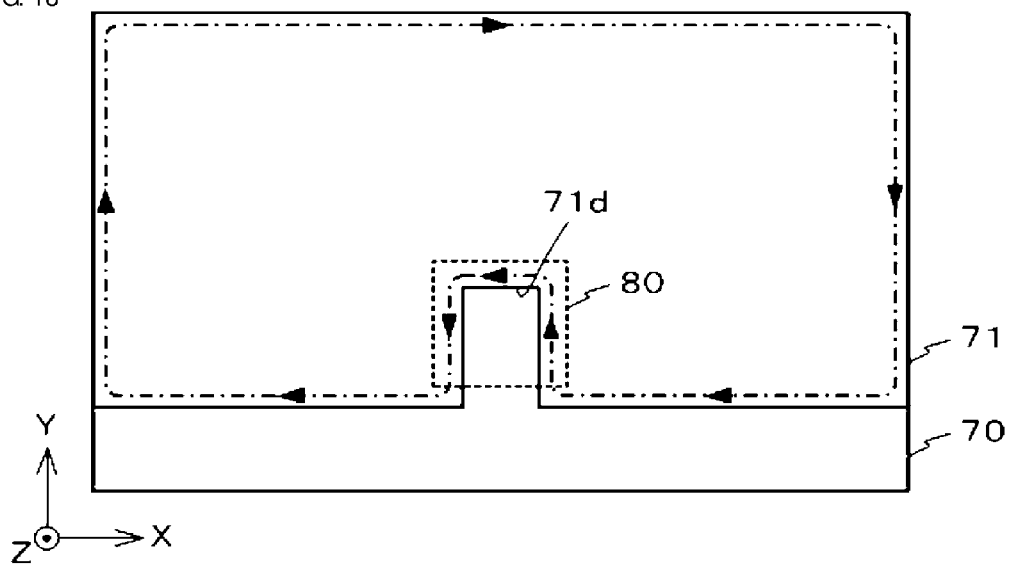
FIG. 18 illustrates a cutout provided in the shield layer.

In the above-described preferred embodiment, as illustrated in FIG. 4, the shield layer 71 includes the aperture 71*a* and the slit 71*b* as the opening. Alternatively, as illustrated in FIG. 17, the shield layer 71 may include only a slit 71*b* as an opening. Further alternatively, as illustrated in FIG. 18, the shield layer 71 may include, as an opening, a cutout 71*d* having an X-axis direction width smaller than that of the antenna 80.

In short, it is only necessary that the shield layer 71 include the opening such that at least a portion of the coil aperture of the power feeding coil 80*a* that constitutes the antenna 80 does not overlap with the shield layer 71. The aperture 71*a*, the slits 71*b* and 71*c*, and the cutout 71*d* may be filled with a magnetically permeable substance such as resin.

In the above-described preferred embodiment, the antenna is mounted on the lower surface of the substrate 70, as illustrated in FIG. 5. Alternatively, a conductor pattern equivalent to the power feeding coil 80*a* may be provided on the lower surface of the substrate 70, and the conductor pattern may function as a power feeding coil of an antenna.

In the above-described preferred embodiment, the computer 10 preferably communicates with the communication target 120. Alternatively, the computer 10 may communicate with a communication terminal such as a smartphone or a tablet terminal, for example.

The program stored in the auxiliary storage unit 93 of the control system 90 in the above-described preferred embodiment preferably is distributed while being stored in a computer-readable recording medium. By uploading this program to the auxiliary storage unit 93, a control system that executes the above-described near field communication is configured.

The program may be stored in, for example, a disk device included in a predetermined server apparatus on a communication network such as the Internet. In this case, for example, the program stored in the disk device is superimposed on a carrier wave and is downloaded in the auxiliary storage unit 93.

In the present invention, it should be noted that various preferred embodiments and modifications can be made without departing from the broad spirit and scope of the present invention. The above-described preferred embodiments are provided to illustrate the present invention and are not intended to limit the scope of the present invention.

The present invention is based on Japanese Patent Application No. 2012-280323 filed Dec. 21, 2012, which is hereby incorporated by reference in its entirety.

The interface unit and the computer according to various preferred embodiments of the present invention are suitable for transmission and reception of information to and from an external apparatus. Further, the interface unit and the program according to various preferred embodiments of the present invention are suitable for communication with an external apparatus.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. An interface unit comprising:
   an electrostatic capacitance pointing device including a pair of electrodes and one surface defining and functioning as an input surface;
   a shield disposed on one of the pair of electrodes and including an opening; and
   a power feeding coil that is smaller than the shield and electromagnetically coupled to the shield; wherein
   the interface unit is configured to communicate with an external apparatus; and
   the opening of the shield extends to an outer edge of the shield.

2. The interface unit according to claim 1, wherein the power feeding coil is disposed such that a coil aperture overlaps with the opening provided in the shield.

3. The interface unit according to claim 1, wherein the power feeding coil is completely aligned with the shield.

4. The interface unit according to claim 1, wherein the opening of the shield is filled with a magnetically permeable substance.

5. The interface unit according to claim 1, wherein the opening of the shield includes an aperture provided in the shield and a slit extending from the aperture to the outer edge of the shield.

6. The interface unit according to claim 1, wherein the opening of the shield is a slit provided in the shield.

7. The interface unit according to claim 1, wherein the shield is a conductor pattern provided on a substrate on which the electrodes are provided.

8. The interface unit according to claim 7, wherein the power feeding coil is provided on a surface of the substrate opposite from a surface on which the conductor pattern is provided.

9. The interface unit according to claim 1, wherein the shield is a metal plate.

10. The interface unit according to claim 1, wherein
    the shield includes an upper surface and a lower surface; and
    the power feeding coil is disposed on the upper surface.

11. The interface unit according to claim 1, wherein the power feeding coil is located between the electrodes and the shield.

12. The interface unit according to claim 1, further comprising:

a substrate on which the electrodes are provided, the substrate including an upper surface and a lower surface; wherein the electrodes and the shield are provided on the upper surface of the substrate;

the power feeding coil is provided on the lower surface of the substrate; and the shield is provided over an entire upper surface of the substrate.

13. The interface unit according to claim 1, wherein the power feeding coil defines a chip antenna.

14. The interface unit according to claim 1, wherein the pointing device is a touchpad.

15. The interface unit according to claim 1, wherein the opening does not overlap with the input surface.

16. The interface unit according to claim 1, wherein the interface unit is provided in one of a computer and a communication apparatus.

17. A computer comprising:

the interface unit according to claim 1; and a communication unit configured to communicate with an external apparatus via the interface unit.

18. The computer according to claim 17, further comprising a metal housing including an aperture from which the input surface of the interface unit is exposed.

19. The computer according to claim 17, wherein a clearance of a predetermined distance is provided between an outer edge of the aperture provided in the housing and an outer edge of the input surface exposed from the aperture.

20. The computer according to claim 17, wherein the computer is one of a notebook computer, a personal computer and a communication apparatus.

* * * * *